United States Patent

[11] 3,631,594

[72] Inventors Hans Dietrich;
Peter Weisse, both of Jena, Germany

[21] Appl. No. 869,401
[22] Filed Oct. 24, 1969
[45] Patented Jan. 4, 1972

[73] Assignee Jenoptik Jena G.m.b.H.
Jena, District of Gera, Germany

[54] METHODS OF MAKING CIRCUIT BOARDS
3 Claims, 5 Drawing Figs.

[52] U.S. Cl. .......... 29/624,
29/423, 29/625, 112/262, 156/93, 174/68.5
[51] Int. Cl. .......... H01b 13/00,
H05k 3/00
[50] Field of Search .......... 29/625,
423, 624; 174/68.5; 112/1, 262; 161/53; 156/90,
91, 92, 93

[56] References Cited

UNITED STATES PATENTS

| | | | |
|---|---|---|---|
| 3,431,351 | 3/1969 | Haberecht | 29/625 |
| 3,130,257 | 4/1964 | Rott | 29/625 |
| 3,114,194 | 12/1963 | Lohs | 29/625 |

*Primary Examiner*—John F. Campbell
*Assistant Examiner*—Ronald J. Shore

ABSTRACT: Insulated wire as lower thread is sewed by a sewing machine to two perforated matrices superposed on one another. The tension of the nonconductive upper thread is such as to cause the wire to extend in loops into the perforations of the matrices. After sewing, the wire is so impressed into carrier material on a board that part of its surface projects therefrom. The carrier material is then cured and the matrices are removed by displacement parallel to one another, so that the upper thread is sheared off and said loops protrude as connecting lugs.

INVENTOR
Hans Wichert
BY Peter Weiße
ATTORNEY

METHODS OF MAKING CIRCUIT BOARDS

This invention is concerned with a method of making circuit boards by embedding conductors of electric wire in carrier material.

The so-called printed circuits of the kind widely used particularly in communication and radio engineering can only deal with comparatively low electric power. Moreover, they are profitable economically only if turned out in quantity production. The small cross-sectional area of the conductors of the usual systems in printed circuit boards is inadequate for higher wattage, so that metal wire cannot be dispensed with as conductor material.

According to a known mechanical method, insulated wire is laid in such a manner as to be held by clips secured in holes in a mounting plate.

In another known method, wiring network is fastened to axially resilient pins that serve as bending points.

In further known methods, mechanically laid wires are fixed to a carrier plate by forcing into boreholes or by riveting or sewing. This kind of attachment holds the wires only at definite fastening points and not along their entire length.

The foregoing methods are complicated and costly and suffer from the additional disadvantage that the insulated wire is easily damaged at the bends, so that undesired contact is created.

The present invention aims at obviating the foregoing disadvantages by providing a simple improved method of making circuit boards by embedding conductors of insulated metal wire in carrier material.

To this end the present invention consists in a method of the foregoing kind, characterized in that metal wire coated with thermoplastic insulation is used as lower thread and sewed by a sewing machine to two superposed perforated matrices, that the wiring network thus created is pressed against a thermoplastic or curing adhesive layer on a plate and by mans of heat is so baked or cemented into this layer that part of the wire surface projects therefrom and, finally, that the upper thread is sheared off by displacing the two matrices in parallel relatively to one another.

When using one matrix, it is advantageous to provide that after fixing the end of the upper thread prior to sewing, this upper thread is stretched so tightly in the process of sewing that the insulated metal wire as lower thread forms loops which extend into the holes of the matrix and after the embedding of the wiring network in the thermoplastic or curing adhesive layer and subsequent removal of the upper thread and the matrix protrude as connecting lugs.

Figure 1:
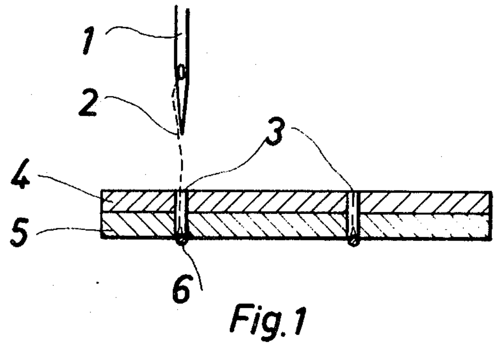
Figure 2:
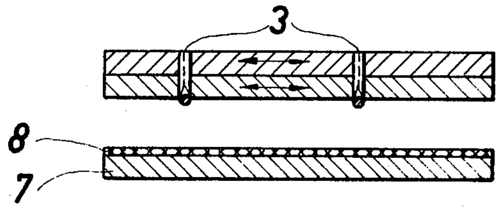
Figure 3:
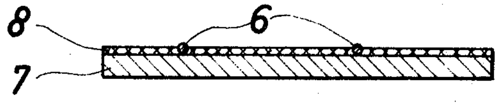
Figure 4:
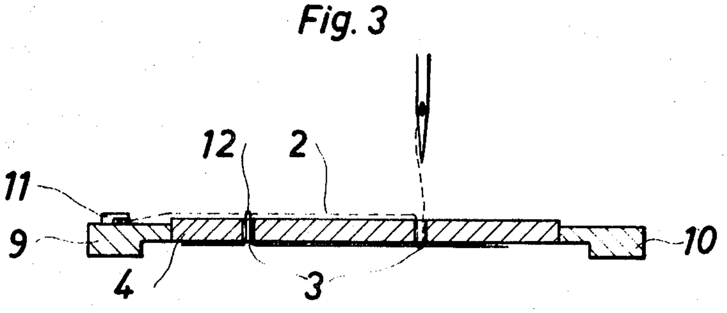
Figure 5:
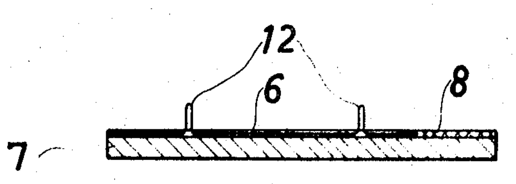

In order that the invention may be more readily understood, reference is made to the accompanying drawings, which illustrate the method of the invention diagrammatically and by way of example, and in which FIG. 1 illustrates the mechanical parts used in the process of sewing a wiring network, FIG. 2 is a mounting board carrying a thermoplastic or curing adhesive layer, prior to pressing against the wire, FIG. 3 is a section through the finished wiring network, FIG. 4 illustrates the mechanical parts used in the process of sewing a wiring network with connecting lugs, and FIG. 5 is a section through the finished wiring network of FIG. 4 with protruding connecting lugs, the network being embedded in the curing adhesive layer.

In FIG. 1 of the drawings, a needle 1 with a nonconductive upper thread 2 sews a metal wire 6 as lower thread on two superposed matrices 4 and 5 through perforations 3 in these matrices, the wire 6 being coated with thermoplastic insulation material (not shown). After the sewing, a plate 7 (FIG. 2) carrying a layer 8 of curing adhesive material is pressed against the network of insulated metal wire, and the network is so connected to the layer 8 by the action of heat that part of its surface projects from this layer, as shown in FIG. 3, whereupon the upper thread 2 is sheared off by displacing the matrices 4 and 5 in parallel relatively to one another.

In FIG. 4 of the drawings, a matrix 4 is fixed between two jaws 9 and 10. A clamping device 11 holds the end of the upper thread 2 against the jaw 9. The upper thread 2 is so stretched that the lower thread, namely the metal wire 6, extends in the form of loops 12 through the perforations 3 in the matrix 4. The finished network (FIG. 5) lies embedded in the layer 8, from which the loops 12 protrude as connecting lugs.

We claim:

1. A method of making wiring networks, characterized in that an upper thread sews a metal wire as lower thread through perforations in at least one matrix, said upper thread being of nonconductive material and said metal wire being insulated by thermoplastic material, that the resulting wiring network on the lower side of the matrix is pressed against an adhesive layer on a carrier plate, that said layer retains said wiring network, that the connection of said wiring network with said upper thread is severed, and that the matrix is removed from said wiring network, 2. A method as claimed in claim 1, characterized in that said metal wire is sewed to two superposed matrices, and that said upper thread after connection of said wiring network to said adhesive layer is sheared off by parallel displacement of said two matrices relative to one another.

3. A method as claimed in claim 1, characterized in that prior to sewing the one end of said upper thread is fixed by a clamping device, that in the process of sewing said upper thread is stretched so tightly that said metal wire forms loops in the perforations of said matrix, and that subsequently to connecting of said wiring network to said adhesive layer and removal of said upper thread said loops protrude from said adhesive layer as connecting lugs.

* * * * *